US008326886B2

(12) United States Patent
Toub et al.

(10) Patent No.: US 8,326,886 B2
(45) Date of Patent: Dec. 4, 2012

(54) PER-THREAD, PER-INSTANCE DATA STORAGE

(75) Inventors: Stephen H. Toub, Seattle, WA (US); Emad Omara, Bellevue, WA (US); John Duffy, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 254 days.

(21) Appl. No.: 12/691,378

(22) Filed: Jan. 21, 2010

(65) Prior Publication Data
US 2011/0179038 A1 Jul. 21, 2011

(51) Int. Cl.
*G06F 7/00* (2006.01)
*G06F 17/30* (2006.01)
(52) U.S. Cl. .................. 707/801; 707/803
(58) Field of Classification Search .......... 707/791, 707/792, 793, 801, 802, 803
See application file for complete search history.

(56) References Cited

U.S. PATENT DOCUMENTS

| 5,511,192 | A | 4/1996 | Shirakihara |
| 5,812,852 | A * | 9/1998 | Poulsen et al. ............ 717/149 |
| 6,115,802 | A * | 9/2000 | Tock et al. ............... 711/216 |
| 6,330,709 | B1 | 12/2001 | Johnson et al. |
| 6,539,464 | B1 * | 3/2003 | Getov .................... 711/170 |
| 6,557,023 | B1 * | 4/2003 | Taivalsaari ............... 718/1 |
| 6,912,553 | B1 | 6/2005 | Kolodner et al. |
| 6,915,408 | B2 * | 7/2005 | Huras .................... 711/220 |
| 6,985,976 | B1 * | 1/2006 | Zandonadi et al. ........... 710/56 |
| 2001/0056457 | A1 * | 12/2001 | Kikuchi et al. ............ 709/104 |
| 2006/0031810 | A1 * | 2/2006 | Peng et al. ............... 717/100 |

OTHER PUBLICATIONS

Wikipedia.com, "Static Variable", http://web.archive.org/web/20060923090502/http://en.wikipedia.org/wiki/Static_variable, Sep. 23, 2006, 3 pp.*
Wikipedia.com, "Decimal", http://web.archive.org/web/20060225224015/http://en.wikipedia.org/wiki/Decimal, Feb. 25, 2006, 6 pp.*
Hodgman, "Fast Thread-Local Storage", Retrieved at <<http://www.gamedev.net/community/forums/topic.asp?topic_id=496356>>, Jun. 2, 2008, pp. 9.
"Fast Virtual Machine Architecture", Retrieved at <<http://www.compaq.com/java/performance/FastVM.html>>, Sep. 22, 2009, pp. 4.
"Using Generic Classes", Retrieved at <<http://www.mathworks.com/access/helpdesk/help/techdoc/index.html?/access/helpdesk/help/techdoc/matlab_external/brz16z_-1.html&http://www.google.co.in/search?hl=en&rlz=1R2GFRG_en&q=parameterize+generic+class+type+static&meta=&aq=f&oq=>>, Sep. 22, 2009, pp. 4.
Toub, Stephen, "Scope<T> and More", Retrieved at <<http://msdn.microsoft.com/en-us/magazine/cc300805.aspx>>, Sep. 2006, pp. 6.
"Thread.GetData Method", Retrieved at <<http://msdn.microsoft.com/en-us/library/system.threading.thread.getdata.aspx>>, Sep. 22, 2009, pp. 7.

\* cited by examiner

*Primary Examiner* — Marc Somers (57) ABSTRACT

A method of storing per-thread, per-instance data, includes identifying a unique index value corresponding to a first instance, identifying type parameters based on the identified index value, and instantiating a generic holder object based on the identified type parameters. The generic holder object includes a thread local field configured to store per-thread data that is local to the first instance.

17 Claims, 6 Drawing Sheets

Fig. 6

PER-THREAD, PER-INSTANCE DATA STORAGE

BACKGROUND

Software programs have been written to run sequentially since the beginning days of software development. Steadily over time, computers have become much more powerful, with more processing power and memory to handle advanced operations. This trend has recently shifted away from ever-increasing single-processor clock rates towards an increase in the number of processors available in a single computer resulting in a corresponding shift away from sequential execution toward parallel execution. Software developers want to take advantage of improvements in computer processing power to enable their software programs to run faster as new hardware is adopted. With parallel hardware, software developers arrange for one or more tasks of a particular software program to be executed in parallel (also referred to as concurrently), so that, for example, the same logical operation can utilize many processors at one time to thereby deliver better performance as more processors are added to the computers on which such software runs.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

One embodiment utilizes generic holder instances containing thread static fields, and at runtime dynamically parameterizes the generic holder instances in a manner so as to achieve fast per-thread, per-instance storage. In one embodiment, generic type instantiation is used as a mechanism to achieve per-instance, per-thread data storage.

One embodiment provides a method of storing per-thread, per-instance data, including identifying a unique index value corresponding to a first instance, identifying type parameters based on the identified index value, and instantiating a generic holder object based on the identified type parameters. The generic holder object includes a thread local field configured to store per-thread data that is local to the first instance.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides a data storage application for per-thread, per-instance storage of data, but the technologies and techniques described herein also serve other purposes in addition to these. In one implementation, one or more of the techniques described herein can be implemented as features within a framework program such as the Microsoft® .NET Framework, or within any other type of program or service.

Existing solutions provide data storage and retrieval for global data (i.e., static data) and data associated with a specific thread (i.e., thread local data, or thread static data, or per-thread data). For example, a class may include a static member, and all instances of that class will share the same value for that static member (i.e., the static member represents global data). For a thread local variable, each thread basically has its own copy of the variable. There are situations where data should be stored not only per-thread, but also per-instance. For per-instance data, a class may include a non-static member, and each individual instance of that class may store a different value for the non-static member. Existing mechanisms in managed frameworks for supporting per-thread, per-instance data storage are often prohibitively expensive. One embodiment provides a solution for per-thread, per-instance data storage taking advantage of, and with performance on par with, per-thread storage mechanisms. One embodiment provides a system and method for thread-local instance-based storage using thread statics.

In the Microsoft® .NET Framework, System.ThreadStaticAttribute provides a fast, Just in Time (JIT)-compiler supported mechanism for storing per-thread data in static variables. When a thread static attribute is placed on a static member, the member is treated as a thread local member. Additionally, generic types or classes in the .NET Framework maintain separate static fields for each generic parameter type set used to instantiate a generic instance. One embodiment takes advantage of these facts, utilizing generic holder instances containing ThreadStatic static fields, and at runtime dynamically parameterizing those generic holder instances in a manner so as to achieve fast per-thread, per-instance storage. In one embodiment, generic type instantiation is used as a mechanism to achieve per-instance, per-thread data storage. In one embodiment, generic type static data holders are recycled for use by future instances, and the system falls back to existing, slower mechanisms for per-instance, per-thread data storage when generic limits are reached.

One embodiment is based on two facts in the .NET execution environment: (1) When ThreadStaticAttribute is applied to a static field, that field maintains a different value per thread that accesses it; and (2) in generic types, a static field applies to a particular set of types used to parameterize the generic type. For example, consider the type or class given in the following Pseudo Code Example I:

Pseudo Code Example I

```
public class MyHolder<T> { public static string Data; }
public class FirstType { }
public class SecondType{ }
```

For the type given in Pseudo Code Example I, the field MyHolder<FirstType>.Data will be different than the field MyHolder<SecondType>.Data. In one embodiment, a ThreadStaticAttribute is applied to a static member of a generic type, and then that generic type is parameterized with multiple T parameters. For each new type parameter that is supplied, a different ThreadStatic field is obtained. In one embodiment, instances of this generic parameterized type are created, with a different parameter set per ThreadLocal instance that is created. Even though the ThreadStatic member is static and is shared by all instances of that type, one embodiment gives each ThreadLocal instance a unique parameterized version of the generic holder that no other ThreadLocal instance shares, thus, in effect making the ThreadStatic static instead an instance member.

Figure 1:
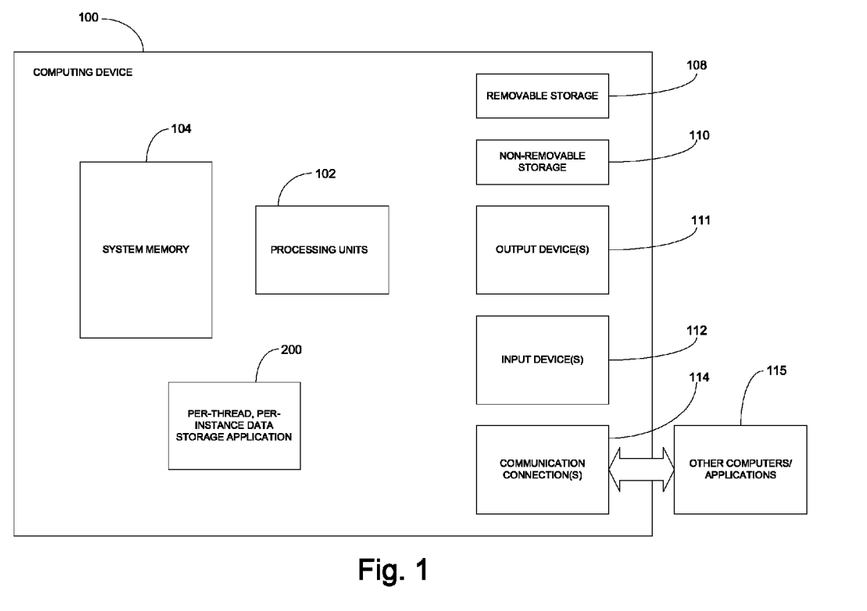
FIG. 1 is a diagram illustrating a computing device suitable for executing a per-thread, per-instance data storage application according to one embodiment.

FIG. 1 is a diagram illustrating a computing device 100 suitable for executing a per-thread, per-instance data storage application according to one embodiment. In the illustrated embodiment, the computing system or computing device 100 includes a plurality of processing units 102 and system memory 104. Depending on the exact configuration and type of computing device, memory 104 may be volatile (such as RAM), non-volatile (such as ROM, flash memory, etc.), or some combination of the two.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media (e.g., computer-readable storage media storing computer-executable instructions for performing a method). Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one embodiment, computing device 100 includes a per-thread, per-instance data storage application 200. Data storage application 200 is described in further detail below with reference to FIG. 2.

Figure 2:
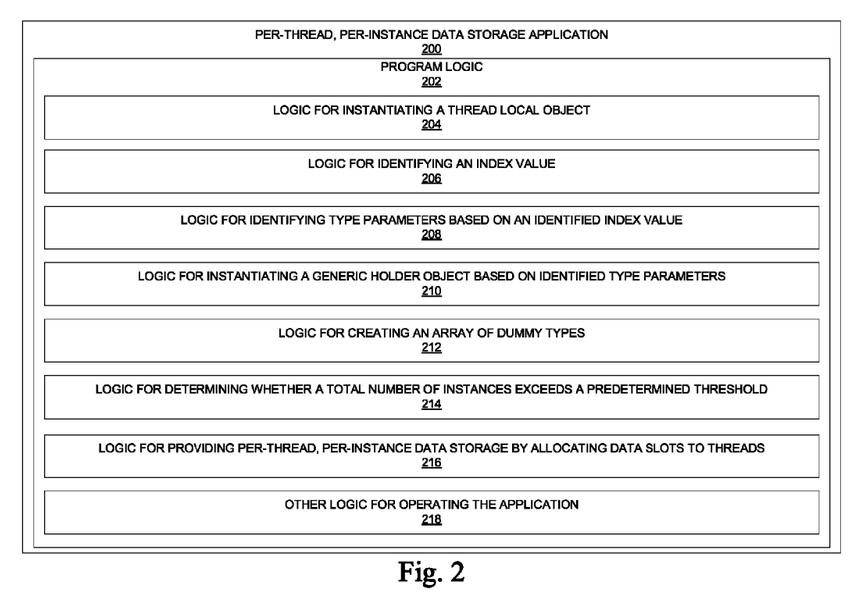
FIG. 2 is a diagrammatic view of a per-thread, per-instance data storage application for operation on the computing device illustrated in FIG. 1 according to one embodiment.

FIG. 2 is a diagrammatic view of a per-thread, per-instance data storage application 200 for operation on the computing device 100 illustrated in FIG. 1 according to one embodiment. Application 200 is one of the application programs that reside on computing device 100. However, application 200 can alternatively or additionally be embodied as computer-executable instructions on one or more computers and/or in different variations than illustrated in FIG. 1. Alternatively or additionally, one or more parts of application 200 can be part of system memory 104, on other computers and/or applications 115, or other such suitable variations as would occur to one in the computer software art.

Data storage application 200 includes program logic 202, which is responsible for carrying out some or all of the techniques described herein. Program logic 202 includes logic 204 for instantiating a thread local object; logic 206 for identifying an index value; logic 208 for identifying type parameters based on an identified index value; logic 210 for instantiating a generic holder object based on identified type parameters; logic 212 for creating an array of dummy types; logic 214 for determining whether a total number of instances exceeds a predetermined threshold; logic 216 for providing per-thread, per-instance data storage by allocating data slots to threads; and other logic 218 for operating the application.

Turning now to FIGS. 3-6, techniques for implementing one or more embodiments of data storage application 200 are described in further detail. In some implementations, the techniques illustrated in FIGS. 3-6 are at least partially implemented in the operating logic of computing device 100.

Figure 3:
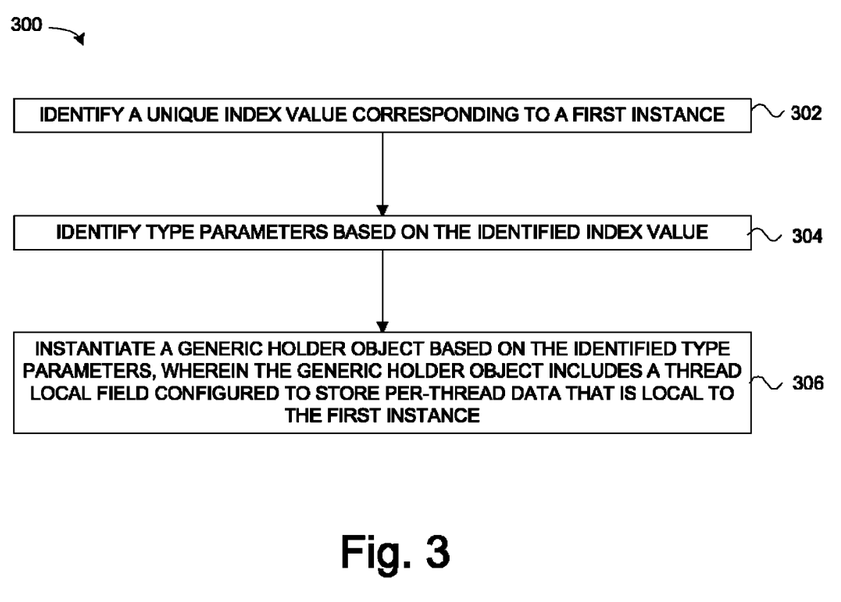
FIG. 3 is a flow diagram illustrating a method of storing per-thread, per-instance data according to one embodiment.

FIG. 3 is a flow diagram illustrating a method 300 of storing per-thread, per-instance data according to one embodiment. At 302 in method 300, a unique index value corresponding to a first instance is identified. At 304, type parameters are identified based on the identified index value. In one embodiment, the identified type parameters are unique to the first instance and are not shared by other instances concurrently (i.e., other instances could use the same parameters later according to one embodiment, as long as no other instance was concurrently using them at the same time). At 306, a generic holder object is instantiated based on the identified type parameters, wherein the generic holder object includes a thread local field configured to store per-thread data that is local to the first instance. The thread local field according to one embodiment is created by applying a thread static attribute to a static variable. In one embodiment, the identifying a unique index value (302), identifying type parameters (304), and instantiating a generic holder object (306) in method 300 are performed by at least one processor.

Figure 4:
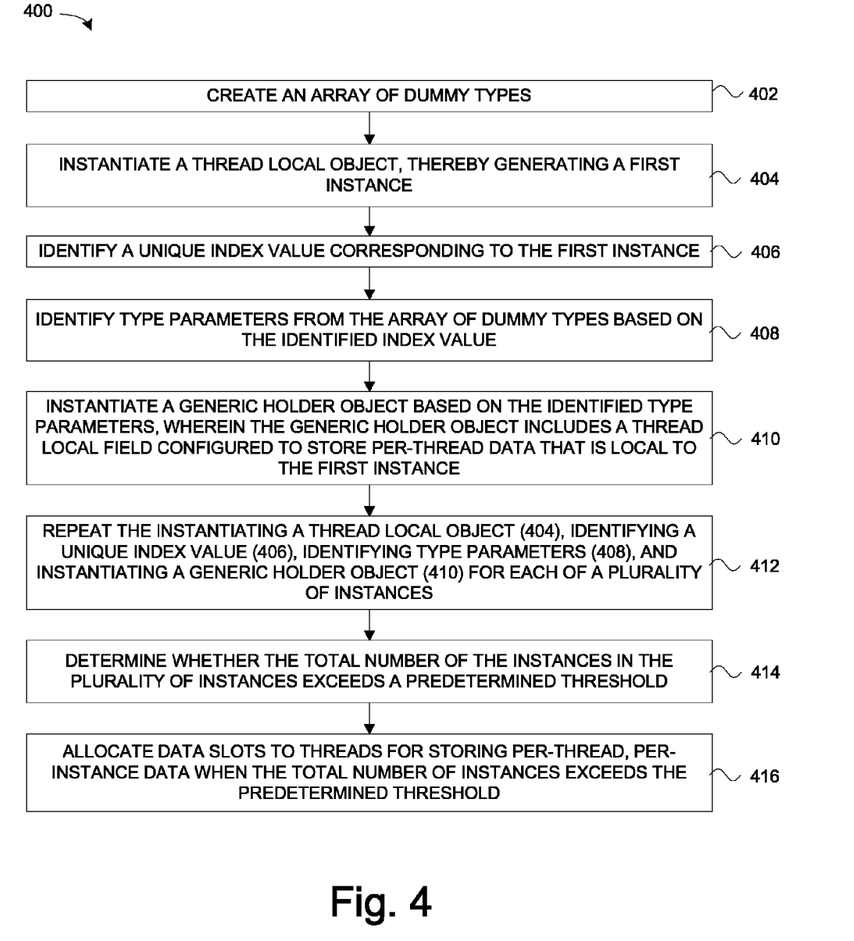
FIG. 4 is a flow diagram illustrating a method of storing per-thread, per-instance data according to another embodiment.

FIG. 4 is a flow diagram illustrating a method 400 of storing per-thread, per-instance data according to another embodiment. At 402 in method 400, an array of dummy types is created. At 404, a thread local object is instantiated, thereby generating a first instance. At 406, a unique index value corresponding to the first instance is identified. At 408, type parameters are identified from the array of dummy types based on the identified index value. In one embodiment, the identified type parameters are unique to the first instance and are not shared by other instances concurrently. At 410, a generic holder object is instantiated based on the identified type parameters, wherein the generic holder object includes a thread local field configured to store per-thread data that is local to the first instance. At 412, the instantiating a thread local object (404), identifying a unique index value (406), identifying type parameters (408), and instantiating a generic holder object (410) in method 400 are repeated for each of a plurality of instances. At 414, it is determined whether the total number of the instances in the plurality of instances exceeds a predetermined threshold. At 416, data slots are allocated to threads for storing per-thread, per-instance data when the total number of instances exceeds the predetermined threshold.

In one embodiment, the first instance in method 400 includes a first field that references the generic holder object and a second field that stores the index value. The thread local field in method 400 according to one embodiment is created by applying a thread static attribute to a static variable.

Figure 5:
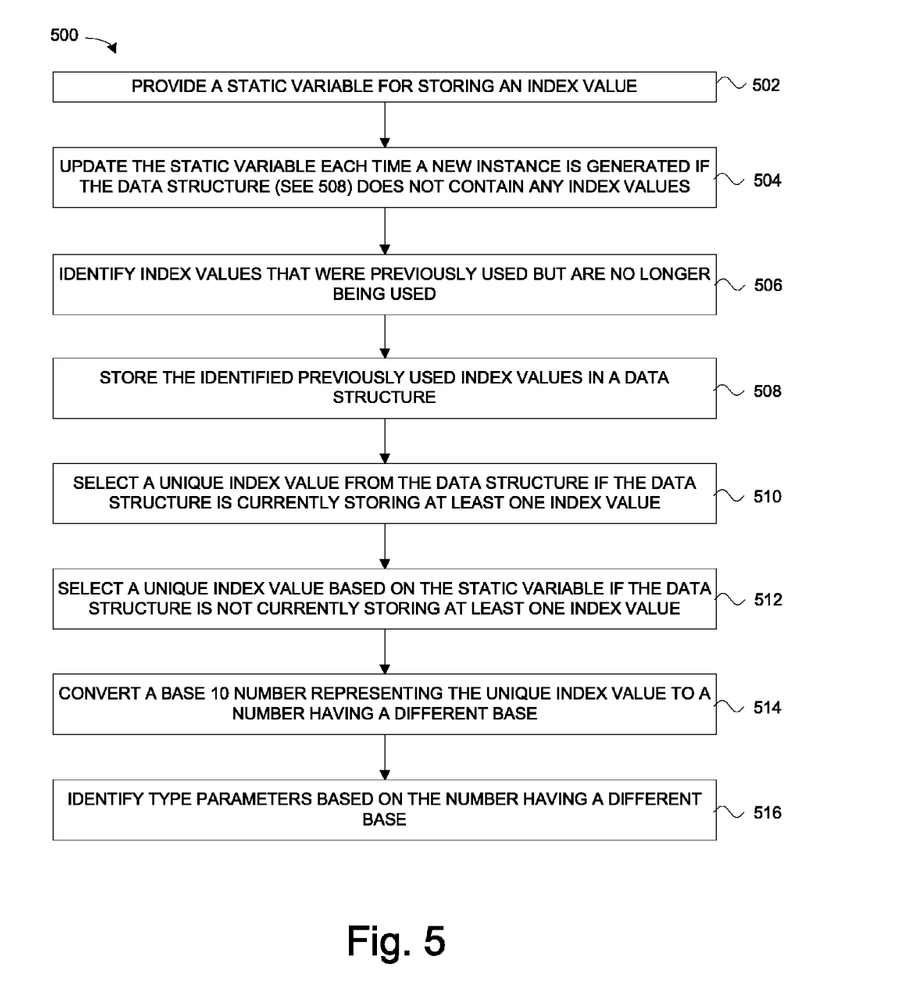
FIG. 5 is a flow diagram illustrating a method of identifying a unique index value according to one embodiment.

FIG. 5 is a flow diagram illustrating a method 500 of identifying a unique index value (e.g., blocks 302 and 406 in FIGS. 3 and 4, respectively) according to one embodiment. At 502 in method 500, a static variable for storing an index value is provided. At 504, each time a new instance is generated, the static variable is updated if the data structure (see 508) does not contain any index values. In one embodiment, the static variable is not updated at 504 if the data structure contains at least one index value. At 506, index values that were previously used but are no longer being used are identified. At 508, the identified previously used index values are stored in a data structure. In one embodiment, an index value is stored in the data structure when the instance finalizer is called, which occurs when the garbage collector detects that the object is not being used anymore and collects the object. An index value may also be stored in the data structure when the user explicitly indicates that the ThreadLocal<T> will not be used anymore by calling its Dispose method. At 510, a unique index value is selected from the data structure if the data structure is currently storing at least one index value. At 512, a unique index value is selected based on the static variable if the data structure is not currently storing at least one index value. In one embodiment, the unique index value is a base 10 number. At 514, the base 10 number representing the unique index value is converted to a number having a different base (e.g., a base 16 number). The base that is selected according to one embodiment is predicated on the number of types used to parameterize the generic holder (e.g., a base of 16 would be selected if 16 dummy types were being used to parameterize). At 516, type parameters are identified based on the number having a different base.

The methods shown in FIGS. 3-5 and discussed above will now be described in further detail with reference to pseudo code examples. In the following examples, the thread local objects mentioned above correspond to instances of a "ThreadLocal<T>" class or type. In one embodiment, an instance of ThreadLocal<T> stores several fields, including the two shown in the following Pseudo Code Example II:

Pseudo Code Example II

```
private HolderBase m_holder;
private int m_currentInstanceIndex;
```

As shown in Pseudo Code Example II, each instance of ThreadLocal<T> includes a HolderBase field and an index field. HolderBase is where the actual T data lives, wrapped in a boxed instance, as shown in the following Pseudo Code Example III:

Pseudo Code Example III

```
abstract class HolderBase
{
    internal abstract Boxed Boxed { get; set; }
}
```

HolderBase is an abstract class to allow ThreadLocal<T> to use multiple storage mechanisms for the data. For example, a class derived from HolderBase could store T using Thread.GetData/SetData methods, as shown in the following Pseudo Code Example IV:

Pseudo Code Example IV

```
sealed class TLSHolder : HolderBase
{
    private LocalDataStoreSlot m_slot =
    Thread.AllocateDataSlot( );
    internal override Boxed Boxed
    {
        get { return (Boxed)Thread.GetData(m_slot); }
        set { Thread.SetData(m_slot, value); }
    }
}
```

One embodiment uses a generic type derived from HolderBase to provide a faster implementation, as shown in the following Pseudo Code Example V:

Pseudo Code Example V

```
sealed class GenericHolder<U, V, W> : HolderBase
{
    [ThreadStatic]
    private static Boxed s_value;
    internal override Boxed Boxed
    {
        get { return s_value; }
        set { s_value = value; }
    }
}
```

In Pseudo Code Example V, the Boxed T is stored directly into a ThreadStatic static member, which is faster than using the Thread.GetData/SetData shown in Pseudo Code Example IV, as the CLR (Common Language Runtime) provides an optimized implementation of this functionality akin to storing data into non-ThreadStatic statics. However, there will be only one static s_value per GenericHolder<U, V, W>. Instance-based storage can be provided by creating a different generic instantiation of GenericHolder (with different U, V, and W types) for each unique s_value to be used. In one embodiment, this is accomplished by retrieving an array of available types (e.g., by reflecting over the assembly in which ThreadLocal<T> lives, and getting a list of all of the reference types in that assembly). In another embodiment, this is accomplished by creating a specific set of dummy types for this purpose, as shown in the following Pseudo Code Example VI:

Pseudo Code Example VI

```
class C0 { } class C1 { } class C2 { } class C3 { }
class C4 { } class C5 { } class C6 { } class C7 { }
class C8 { } class C9 { } class C10 { } class C11 { }
class C12 { } class C13 { } class C14 { } class C15 { }
private static Type[ ] s_dummyTypes =
{
typeof(C0), typeof(C1), typeof(C2), typeof(C3),
typeof(C4), typeof(C5), typeof(C6), typeof(C7),
typeof(C8), typeof(C9), typeof(C10), typeof(C11),
typeof(C12), typeof(C13), typeof(C14), typeof(C15)
};
```

Types from the list given in Pseudo Code Example VI can be used to parameterize the GenericHolder<U, V, W>. In one embodiment, types from the list are retrieved based on a specified index as shown in the following Pseudo Code Example VII:

Pseudo Code Example VII

```
private Type[ ] GetTypesFromIndex(int index)
{
    Type[ ] types = new Type[TYPE_DIMENSIONS];
    for (int i = 0; i < TYPE_DIMENSIONS; i++)
    {
        types[i] = s_dummyTypes[index % s_dummyTypes.Length];
        index /= s_dummyTypes.Length;
    }
    return types;
}
```

The index in Pseudo Code Example VII is used to compute a unique combination of types for each of U, V, W, which can then be used to instantiate a GenericHolder<U, V, W>. In one embodiment, every ThreadLocal<T> gets its own unique index, which is accomplished by maintaining a static integer variable that is updated atomically for every new ThreadLocal<T> instance that is created. In one embodiment, the updating of the static integer variable does not occur if a previously used but currently unused index value is available, or if a limit has been exceeded. The code in Pseudo Code Example VII according to one embodiment maps a base 10 index value to a base 16 number that is used to identify a set of types U, V, W.

The value for TYPE_DIMENSIONS in Pseudo Code Example VII for the case of a GenericHolder with three type parameters (i.e., U, V, and W) would be 3. If GenericHolder were instead created to be GenericHolder<U, V, W, X>, the value for TYPE_DIMENSIONS would be 4. The number of unique indexes is s_dummyTypes.Length raised to the TYPE_DIMENSIONS power. Thus, with the above example, there can be 16^3 (i.e., 4096) unique instances of GenericHolder<U, V, W>.

The number of unique instances of GenericHolder can be increased by adding more dummy types and/or increasing the number of type dimensions. There are some potential issues that arise from this, however. At some point, if enough ThreadLocal<T> instances are created, the system will run out of available indices (given that, as implied above, there is a hardcoded limit in one embodiment due to the number of dummy types and the number of type dimensions). This is addressed in one embodiment by pooling the indices from ThreadLocal<T> instances that are no longer in use. When a ThreadLocal<T> is no longer used (which can be detected through finalization or through explicit disposal of an instance), its index is added to a shared thread-safe data structure (e.g., a concurrent stack) that maintains the set of all previously used but currently unused indices. When a new ThreadLocal<T> is instantiated, it first checks this data structure to see if there are any such available indices, and if there is, it takes it and uses it. If there are not any such available indices, it checks the shared integer variable referred to previously that is updated atomically for every new ThreadLocal<T> instance created, and as long as the value of the variable is lower than the maximum, the value is incremented and used as the index for the new instance.

Due to potential memory consumption concerns that arise from having the runtime environment instantiate too many instances of GenericHolder<U, V, W> parameterized in different ways and for different values of T, the system according to one embodiment also enforces a maximum on the total number of generic holders created across all types. This is accomplished in one embodiment by maintaining another global count, which is used to indicate how many unique generic instantiations have been performed. In one embodiment, if the value of the global count reaches a maximum, the system falls back to a slower implementation that is not based on generic instantiations (in one embodiment, the system will still use the faster implementation if it can get an index out of the unused pool).

In the case of fallback according to one embodiment, TLSHolder is used, as shown in Pseudo Code Example IV. This enables an unlimited number of ThreadLocal<T> instances (up to the implicit maximum allowed due to system resources, such as memory), where the majority execute on the fast path based on generic instantiations, but in the event that too many ThreadLocal<T> instances are all created to run concurrently, those remaining can still function, but will employ a slower solution in one embodiment.

In one embodiment, HolderBase (from which TLSHolder and GenericHolder<U, V, W> are derived) stores a Boxed instance, which wraps a T instance, rather than storing a T directly. There are a couple of reasons for doing this. First, accessing fields on an instance is faster than accessing a static, a ThreadStatic, or a TLS data (Thread.GetData/SetData). In situations where a single operation internal to ThreadLocal<T> may need to employ multiple reads/writes against the backing data source, it is more efficient to retrieve the Boxed value from the holder once and then read/write its T field, rather than forcing all read/write operations to go against the HolderBase directly. Second, due to the pooling/reuse of GenericHolder<U, V, W> instances that is performed in one embodiment, it is possible that two different instances of ThreadLocal<T> could end up using the same set of U, V, W parameters over the lifetime of an application. If that happens, and if the same thread ends up accessing both, that Thread will end up seeing the same ThreadStatic state for both, since it is the same underlying GenericHolder<U, V, W> type. As such, the Boxed instance also maintains a reference to the ThreadLocal<T> to which it is currently associated. In one embodiment, when code accesses the Boxed instance's T value, it also checks to see whether the Boxed contains the most up-to-date ThreadLocal<T> instance reference. If it does not contain the most up-to-date reference, this means the Boxed instance is stale, and in one embodiment is treated as uninitialized, rather than reusing the existing value found. An example of a Boxed class according to one embodiment is given in the following Pseudo Code Example VIII:

Pseudo Code Example VIII

```
class Boxed
{
    internal T Value;
    internal HolderBasem_ownerHolder;
}
```

One embodiment provides built-in initialization support for initializing data stored in ThreadLocal<T> instances. Consider the code given in the following Pseudo Code Example IX:

Pseudo Code Example IX

```
[ThreadStatic]
static string s_myValue = ComputeValue( );
```

The code in Example IX creates a thread-static variable s_myValue, meaning that every thread will get its own copy of s_myValue, which stores a string. Additionally, s_myValue is initialized to the result of running the ComputeValue method. However, the way this works in C# is that the compiler generates code such that ComputeValue is only evaluated once, which means that its evaluation and storage into s_myValue only happens for one thread, and not for any others in the system. This makes it difficult to initialize s_myValue. Code such as that given in the following Pseudo Code Example X could be executed prior to each access to s_myValue, in order to make sure that is has been initialized properly:

Pseudo Code Example X

```
if (s_myValue == null) s_myValue = ComputeValue( );
```

One embodiment addresses this initialization issue by allowing the developer to provide to ThreadLocal<T> a delegate (i.e., an object that represents a function) that is invoked on each thread in order to initialize the value. An example is given in the following Pseudo Code Example XI:

Pseudo Code Example XI

```
static ThreadLocal<string> s_myValue = new
    ThreadLocal<string>(ComputeValue);
```

The code in Example XI creates a ThreadLocal<string> instance that ensures that every thread that accesses s_myValue.Value will have it initially initialized to the result of running ComputeValue.

Figure 6:
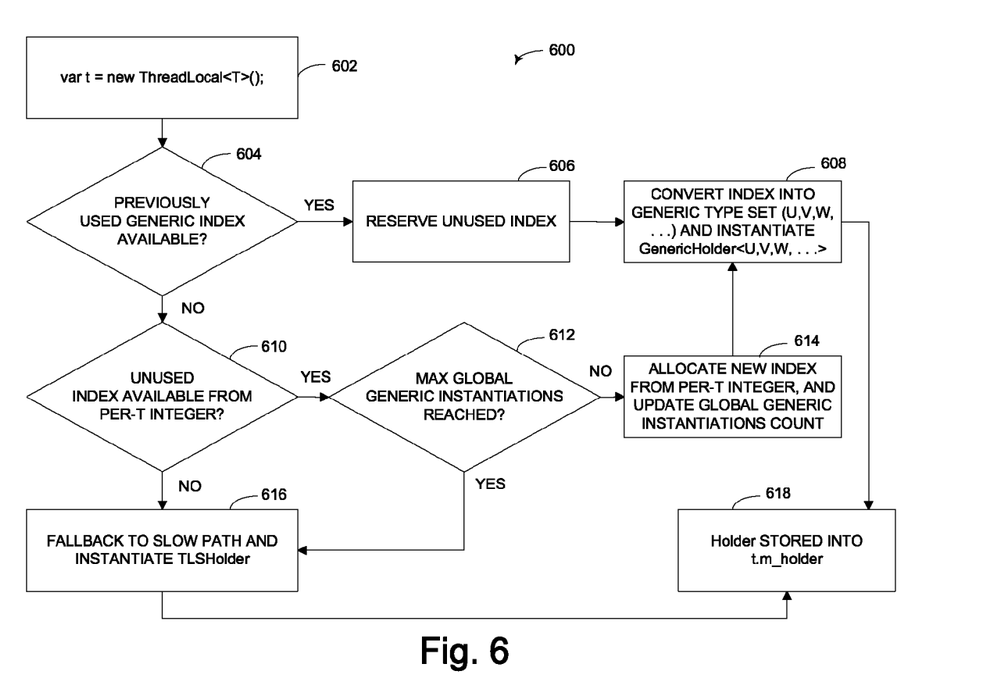
FIG. 6 is a flow diagram illustrating method of generating a holder for storing per-thread, per-instance data according to one embodiment.

FIG. 6 is a flow diagram illustrating method 600 of generating a holder for storing per-thread, per-instance data according to one embodiment. At 602 in method 600, an instance of ThreadLocal<T> is generated and is assigned to the variable "t". At 604, it is determined whether there is a previously used generic index available. If it is determined at 604 that there is a previously used generic index available, the next unused index is reserved at 606. At 608, the previously used generic index is converted into a generic type set (U, V, W, . . . ), and an instance of GenericHolder<U, V, W, . . . > is generated. At 618, the GenericHolder<U, V, W, . . . > instance is stored into t.m_holder.

If it is determined at 604 that there is not a previously used generic index available, the method 600 moves to 610, where it is determined whether an unused index is available from a per-T integer. If it is determined at 610 that an unused index is available, it is next determined at 612 whether a Max Global (i.e., not per-T) generic instantiations threshold has been reached. If it is determined at 612 that the Max Global threshold has not been reached, the method 600 moves to 614, where a new index is allocated from the per-T integer and a global generic instantiations count is updated, and the method 600 then moves to 608 (discussed above).

If it is determined at 610 that an unused index is not available, or if it is determined at 612 that the Max Global threshold has been reached, the method 600 moves to 616. At 616, the method 600 falls back to a slow path for providing per-thread, per-instance storage, using TLSHolder, and the method 600 then moves to 618 (discussed above).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of storing per-thread, per-instance data, comprising:
    identifying a unique index value corresponding to a first instance of a class;
    identifying type parameters based on the identified index value;
    instantiating a generic holder object based on the identified type parameters, the generic holder object including a thread local field configured to store per-thread data that is local to the first instance;
    wherein the identifying a unique index value, identifying type parameters, and instantiating a generic holder object are performed by at least one processor;
    repeating the identifying a unique index value, identifying type parameters, and instantiating a generic holder object, for each of a plurality of instances;
    determining whether a total number of the instances in the plurality of instances exceeds a predetermined threshold; and
    allocating data slots to threads for storing per-thread and per-instance data when the total number of instances exceeds the predetermined threshold.

2. The method of claim 1, wherein the thread local field is created by applying a thread static attribute to a static variable.

3. The method of claim 1, wherein the identified type parameters are unique to the first instance and are not shared by other instances concurrently.

4. The method of claim 1, and further comprising:
instantiating a thread local object that includes a first field that references the generic holder object and a second field that stores the index value.

5. The method of claim 1, and further comprising:
creating an array of dummy types; and
wherein the identified type parameters are taken from the array of dummy types.

6. The method of claim 1, and further comprising:
providing a static variable for storing an index value; and
updating the static variable each time a new instance is generated.

7. The method of claim 6, and further comprising:
identifying index values that were previously used but are no longer being used; and
storing the identified previously used index values in a data structure.

8. The method of claim 7, wherein the identifying a unique index value comprises:
selecting the unique index value from the data structure if the data structure is currently storing at least one index value; and
selecting the unique index value based on the static variable if the data structure is not currently storing at least one index value.

9. The method of claim 1, wherein the unique index value is a base 10 number, and wherein the method further comprises:
converting the base 10 number to a number having a different base; and
wherein the type parameters are identified based on the number having a different base.

10. A computer-readable storage medium storing computer-executable instructions that when executed by at least one processor cause the at least one processor to perform a method of storing per-thread, per-instance data, the method comprising:
identifying a unique index value corresponding to a first instance of a class;
identifying type parameters based on the identified index value;
instantiating a generic holder object based on the identified type parameters, the generic holder object including a thread local field configured to store per-thread data that is local to the first instance;
creating an array of dummy types; and
wherein the identified type parameters are taken from the array of dummy types.

11. The computer-readable storage medium of claim 10, wherein the thread local field is created by applying a thread static attribute to a static variable.

12. The computer-readable storage medium of claim 10, wherein the identified type parameters are unique to the first instance and are not shared by other instances concurrently.

13. The computer-readable storage medium of claim 10, wherein the method further comprises:
instantiating a thread local object that includes a first field that references the generic holder object and a second field that stores the index value.

14. The computer-readable storage medium of claim 10, wherein the method further comprises:
providing a static variable for storing an index value; and
updating the static variable each time a new instance is generated.

15. The computer-readable storage medium of claim 14, wherein the method further comprises:
identifying index values that were previously used but are no longer being used; and
storing the identified previously used index values in a data structure.

16. The computer-readable storage medium of claim 15, wherein the identifying a unique index value comprises:
selecting the unique index value from the data structure if the data structure is currently storing at least one index value; and
selecting the unique index value based on the static variable if the data structure is not currently storing at least one index value.

17. A method of storing per-thread, per-instance data, comprising:
instantiating a thread local object, thereby generating a first instance of a class;
identifying a unique index value corresponding to the first instance;
identifying type parameters based on the identified index value;
instantiating a generic holder object based on the identified type parameters, the generic holder object including a thread local field configured to store per-thread data that is local to the first instance;
wherein the instantiating a thread local object, identifying a unique index value, identifying type parameters, and instantiating a generic holder object are performed by at least one processor;
creating an array of dummy types; and
wherein the identified type parameters are taken from the array of dummy types.

* * * * *